United States Patent [19]
Pitsch et al.

[11] 3,940,536
[45] Feb. 24, 1976

[54] MECHANICALLY REINFORCED HIGH POROSITY PARTIALLY FUSED GLASS FIBER GALVANIC SEPARATOR

[75] Inventors: Johann Pitsch; Pierre Lasserre, both of Nanterre, France

[73] Assignees: Compagnie Europeenne d'Accumulateurs, Paris; Societe Fulmen, Clichy, both of France

[22] Filed: July 3, 1973

[21] Appl. No.: 376,245

[30] Foreign Application Priority Data
July 3, 1972 France .............................. 72.24031

[52] U.S. Cl. ................ 428/288; 427/121; 427/385; 428/332; 428/372; 428/402
[51] Int. Cl.² .......................................... D04H 1/58
[58] Field of Search......... 117/98, 126 GB, 126 GE, 117/140 A; 136/145, 146, 148, 142, 143; 29/73, 74 R; 427/385; 428/288, 332, 372, 402

[56] References Cited
UNITED STATES PATENTS

| | | | |
|---|---|---|---|
| 2,568,144 | 9/1951 | Cremer et al. | 154/101 |
| 2,578,534 | 12/1951 | Giles et al. | 136/146 |
| 2,664,376 | 12/1953 | Philipps | 136/148 |
| 2,673,887 | 3/1954 | Booth | 136/146 |
| 3,035,110 | 5/1962 | Corren | 136/148 |
| 3,084,091 | 4/1963 | Volitman et al. | 136/148 |
| 3,328,230 | 6/1967 | Levecque et al. | 136/146 |
| 3,814,622 | 6/1974 | Isshiki et al. | 117/126 GB |

*Primary Examiner*—Ralph Husack
*Assistant Examiner*—Sadie L. Childs
*Attorney, Agent, or Firm*—Sughrue, Rothwell, Mion, Zinn & Macpeak

[57] ABSTRACT

A separator for a galvanic element wherein partially fused glass fibers are coated by a coating consisting of grains of thermo-hardening synthetic material immersed in a natural or synthetic latex to mechanically reinforce the knots in the glass fiber network resulting from partial fusion of the glass fibers without blocking the pores of the partially fused fiber network.

5 Claims, 1 Drawing Figure

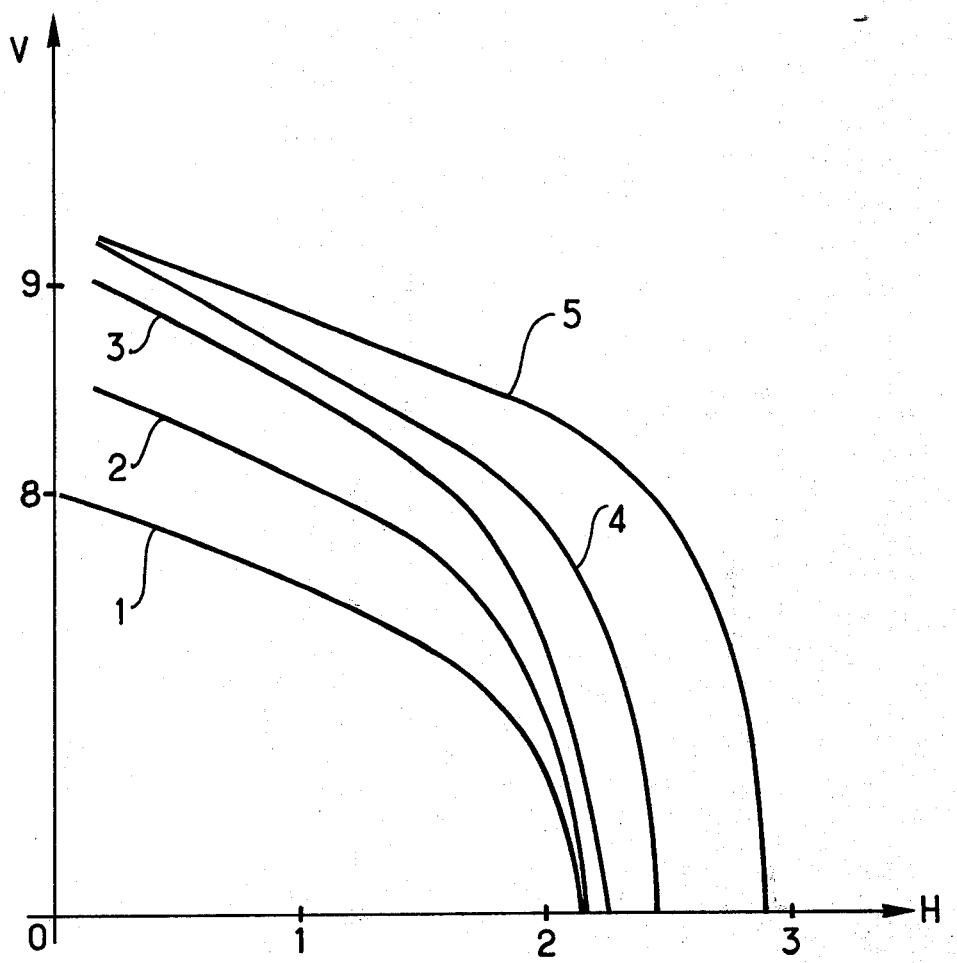

MECHANICALLY REINFORCED HIGH POROSITY PARTIALLY FUSED GLASS FIBER GALVANIC SEPARATOR

BACKGROUND OF THE INVENTION

1. Field of the Invention

The present invention relates to a separator for a galvanic element.

2. Description of the Prior Art

It is known that separators for galvanic elements must fulfil numerous and sometimes contradictory technical and technological requirements.

Separators must prevent short-circuits between the elements by standing in the way of the particles. However, the electrical resistance of the separator to the circulation of ions must be as low as possible.

Separators have the mechanical role of supporting the active material which tends to become dislodged from the plates. They also ensure the displacement of these plates.

Separators must also facilitate the release of gas and be resistant to the chemical products contained in the battery.

Various types of separators are known, the best being those made of fiber glass. It was first proposed to use conventional separators, for example, cellulose separators, covered on one or two of their faces with a layer of fiber glass. The features of these separators were then improved by replacing the cellulose fiber part with fiber glass agglomerated by partial fusion.

This improved separator has the bond obtained by fusing the fiber glass could be reinforced by impregnating it with a suitable synthetic resin of a hydrophilic nature.

SUMMARY OF THE INVENTION

The object of the present invention is to provide a separator which has superior mechanical and electrical features to those of the separators known hitherto.

Another object of the invention is to provide a separator, the mechanical features of which permit the use of modern accumulator battery assembly techniques, particularly as far as automation is concerned.

The invention also relates to a separator for a galvanic element comprising glass fibers agglomerated by partial fusion and having a diameter of a few microns, characterized in that it also comprises a coating consisting of grains of synthetic, thermo-hardening material immersed in a suitable natural or synthetic latex bonding agent.

Other objects, features and advantages of the present invention will be made apparent from the following detailed description provided with reference to the single FIGURE. The FIGURE shows by way of example the voltage curves for various known separators and for the separator according to the invention as a function of the discharge time of a 12 V lead accumulator battery discharged at full rate and at a low temperature.

In the accompanying FIGURE, curve 1 applies to a conventional cellulose separator covered on one face with a fiber glass coating. Curve 2 applies to a separator described in the French Pat. No. 1 175 515. This separator comprises a central, partially fused, glass fiber portion covered on its two faces with a glass fiber coating.

It was desired to improve the following features:

1. To increase the mechanical resistance to stress, to allow the use of automatic assembly machines.
2. To increase the initial voltage of the battery during rapid discharges.
3. To increase the discharging time.

It is known that the initial voltage may be increased by reducing the electrical resistance of the separator. This may be reduced by removing the fiber glass coating.

Curve 4 shows the features obtained by modifying the separator corresponding to curve 2 by removing the fiber glass coating. It will be noted that the removal of the fiber glass coating considerably improves the initial voltage and to some extent increases the discharging time, thus fulfilling aims 1) and 2) mentioned above. On the other hand, aim 1), i.e., the mechanical resistance, is not only not attained but as the fiber glass separator has been subject to partial fusion it is particularly fragile and unable to withstand any industrial treatment, particularly automatic handling.

With reference to the prior patent cited above, it was sought to increase the mechanical resistance by impregnating the sheet consisting of partially fused agglomerated fibers, with a synthetic resin, more particularly a phenolic resin, while eliminating the fiber glass coating so as to retain the benefit of the improvement in the electrical features described above.

Contrary to the statements made in the prior patent and contrary ot the expectations of the specialists, it was found that this combination (impregnation with a phenolic resin and elimination of the coating provided a marginally satisfactory result as far as the mechanical features were concerned, but a clearly unsatisfactory result as far as the electrical features were concerned. Curve 3 shows that the initial voltage has been reduced slightly with respect to the preceding case (curve 4) while the discharging time is considerably lower, almost reaching the insufficient values corresponding to the conventional separators represented by curves 1 and 2.

The various tests have shown that the impregnation of fibers by a synthetic resin results in the reduction in the electrical features of the separator. In the first certificate of addition No. 69 573 to the French Pat. No. 1 149 289 (cited in French Pat. No. 1 175 515) it was proposed to improve the mechanical features of glass fiber sheets by impregnating them with various resins (polyvinyls, phenolic resins, melamines, polystyrenes, polyesters, epoxy) or with mixtures of these resins. It was also proposed to use impregnations of gums, starches, gelatin or Bakelite. Tests made along these lines produced results similar to those represented by curve 3 in the accompanying drawing. It thus appeared that the problem of simultaneously improving the mechanical features and the electrical features could not be solved by impregnation. The tests showed that the difficulties encountered seemed to be due to the fact that the impregnating material blocked the pores of the separator, thus increasing the electrical resistance and losing the benefit of the removal of the fiber glass coating.

However, the problem was solved when it was discovered that the desired results could be obtained by coating the separator with a product consisting of a special mixture of thermo-hardening, synthetic resin and a natural or synthetic bonding agent.

More particularly, it was discovered that the impregnation of partially fused fiber glass with a mixture of synthetic latex and phenol-formaldehyde resin made it possible to obtain the desired aim, i.e., to simultaneously improve the electrical and mechanical properties of the separator so that it could be used industrially without requiring a fiber glass coating.

Curve 5 shows the electrical properties obtained with a separator provided with a coating consisting of a mixture of substantailly equal parts of a phenol formaldehyde resin plus urea in an aqueous solution and of a copolymer -styrene-butadiene latex dispersed in water. The separator coated in this way was treated in the drying oven to dry the latex and polymerize the resin.

Curve 5 shows in particular that the initial voltage is not reduced with respect to that of the non-impregnated separator without a coating, but that on the other hand it is greater than that obtained in the case of the separator not provided with a coating but impregnated with a synthetic resin alone.

In addition, curve 5 shows that the discharging time is considerably increased with respect to that of the known separators.

The improvement in the electrical properties can be considered as being due to the fact that the microscopic grains of resin attach themselves to the nodes formed by the glass fibers and improve the mechanical properties while leaving the porosity of the separator intact. The porosity of the separator according to the invention is greater than the porosity of the conventional separators due to the removal of the fiber glass coating.

The separator according to the present invention is particularly suitable for use in lead accumulator batteries.

The present invention is obviously not limited to the embodiment which has been described and represented and which was provided purely by way of a non-limitative example. Without departing from the scope of the invention, it is possible to change certain arrangements and replace certain means by equivalent means.

What is claimed is:

1. In a separator for a galvanic element comprising glass fibers agglomerated by partial fusion and having a diameter of a few microns, the improvement comprising: a thermal hardened coating on said agglomerated fibers, said coating consisting of grains of thermo-hardened, synthetic material immersed in a natural or synthetic latex; said synthetic material and said natural or synthetic latex being in sufficient amount such that said thermal hardened coating of grains of thermo-hardened synthetic material immersed in said natural or synthetic latex acts to mechanically reinforce the knots in the glass fiber network resulting from partial fusion of the glass fibers without blocking the pores of the partially fused fiber network.

2. A separator for a galvanic element according to claim 1, characterized in that the grains of thermo-hardening material are selected from the phenolic resins, the melamines, polystyrenes, polyesters or epoxy resins.

3. A separator for a galvanic element according to claim 2, characterized in that the thermo-hardening material is a phenol-formaldehyde resin.

4. A separator for a galvanic element according to claim 2, characterized in that the latex is a copolymer-styrene-butadiene.

5. A process for the manufacture of a separator comprising the steps of:
   agglomerating by partial fusion glass fibers having a diameter of a few microns,
   coating said agglomerated fibers with a coating comprising equal parts of a thermo-hardening resin in an aqueous solution and synthetic latex dispersed in water, and
   drying said coated separator in a drying oven to dry the latex and polymerize the resin.

* * * * *